United States Patent [19]

Morgan

[11] Patent Number: 4,959,790

[45] Date of Patent: Sep. 25, 1990

[54] APPARATUS AND METHOD FOR PRODUCING COLOR CORRECTED REPRODUCTION OF COLORED ORIGINAL IMAGES

[75] Inventor: Fred P. Morgan, Fortson, Ga.

[73] Assignee: F & S Corporation of Columbus, Georgia, Fortson, Ga.

[21] Appl. No.: 212,714

[22] Filed: Jun. 28, 1988

[51] Int. Cl.$^5$ ............... G03F 3/08; G03F 3/10; G06F 15/68

[52] U.S. Cl. ............... 364/518; 358/80; 364/519

[58] Field of Search ............... 364/518, 519, 526, 521; 358/75, 80

[56] References Cited

U.S. PATENT DOCUMENTS

| | | | |
|---|---|---|---|
| 4,060,829 | 11/1977 | Sakamoto | 358/80 |
| 4,090,243 | 5/1978 | Kotera et al. | 364/526 |
| 4,154,523 | 5/1979 | Rising et al. | 355/38 |
| 4,174,173 | 11/1979 | Pone, Jr. | 355/38 |
| 4,339,517 | 7/1982 | Akimoto | 430/30 |
| 4,371,260 | 2/1983 | Yoshimoto et al. | 355/77 |
| 4,414,635 | 11/1983 | Gast et al. | 364/526 |
| 4,468,692 | 8/1984 | Yamada et al. | 358/80 X |
| 4,481,532 | 11/1984 | Clark et al. | 358/80 |
| 4,482,917 | 11/1984 | Gaulke et al. | 358/80 |
| 4,488,245 | 12/1984 | Dalke et al. | 364/526 |
| 4,505,589 | 3/1985 | Ott et al. | 356/402 |
| 4,564,859 | 1/1986 | Knop et al. | 358/75 |
| 4,590,515 | 5/1986 | Wellendorf | 358/75 |
| 4,597,670 | 7/1986 | Ohashi et al. | 356/405 |
| 4,602,294 | 7/1986 | Yamada | 358/280 |
| 4,605,954 | 8/1986 | Bestenreiner et al. | 358/27 |
| 4,613,897 | 9/1986 | Stansfield | 358/80 |
| 4,613,947 | 9/1986 | Suzuka et al. | 364/526 |
| 4,617,592 | 10/1986 | MacDonald | 358/80 |
| 4,622,582 | 11/1986 | Yamada | 358/80 |
| 4,623,972 | 11/1986 | Darby et al. | 364/526 |
| 4,623,973 | 11/1986 | Hoffrichter et al. | 364/526 |
| 4,626,903 | 12/1986 | Giesche et al. | 358/80 |
| 4,631,578 | 12/1986 | Sasaki et al. | 358/80 |
| 4,639,770 | 1/1987 | Jung et al. | 358/80 X |
| 4,639,771 | 1/1987 | Hattori et al. | 358/80 |
| 4,641,184 | 2/1987 | Alston | 358/75 |
| 4,649,502 | 3/1987 | Keller et al. | 364/519 |
| 4,653,014 | 3/1987 | Mikami et al. | 364/526 |
| 4,665,496 | 5/1987 | Ott | 364/526 |
| 4,680,596 | 7/1987 | Logan | 358/75 X |
| 4,680,625 | 7/1987 | Shoji et al. | 358/80 |
| 4,682,186 | 7/1987 | Sasaki et al. | 346/140 R |
| 4,683,492 | 7/1987 | Sugiura et al. | 358/80 |
| 4,691,229 | 9/1987 | Colditz et al. | 358/76 |
| 4,706,206 | 11/1987 | Benoit et al. | 364/526 |
| 4,707,120 | 11/1987 | Yamamoto | 355/38 |
| 4,717,954 | 1/1988 | Fujita et al. | 358/80 |
| 4,719,506 | 1/1988 | Van Buren | 358/80 |
| 4,819,193 | 4/1986 | Imao | 364/526 |

Primary Examiner—Gary V. Harkcom
Assistant Examiner—Michael A. Jaffe
Attorney, Agent, or Firm—Hovey, Williams, Timmons & Collins

[57] ABSTRACT

A system for producing output signals representative of the densities of coloring agents such as process inks, toners, or the like used in producing color reproductions which are color corrected for the effects of linearity failures of the coloring agents at various densities and combinations thereof. The preferred system includes a scanner for providing input signals representative of the primary color readings of an original color image and a microcomputer having a memory for storing data representative of increments of primary color readings and corresponding agent color densities, contribution factors, and contribution correction factors. In use, the microcomputer is operated to determine the final coloring agent densities as respective functions of corresponding initial agent color densities and respective contribution amounts from the other agent colors and to produce output signals representative thereof.

21 Claims, 7 Drawing Sheets

SET-UP

COLOR CORRECTION

CYAN CORRECTION

MAGENTA CORRECTION

YELLOW CORRECTION

BLACK ENHANCEMENT

GRAY COMPONENT REMOVAL

APPARATUS AND METHOD FOR PRODUCING COLOR CORRECTED REPRODUCTION OF COLORED ORIGINAL IMAGES

BACKGROUND OF THE INVENTION

1. Field of the Invention

The present invention concerns a system for providing output signals representative of color corrected color densities of coloring agents used in reproducing a colored original image. More particularly, the present invention automatically provides the output signals representative of the color corrected color densities in response to input signals representative of the primary color readings of the original image.

2. Description of the Prior Art

The art of color reproduction strives to faithfully reproduce the colors of the original image. More particularly, color reproduction strives to create a reproduced image which reflects the same spectral colors, typically measured in terms of red, green and blue, as the original. Instruments such as a densitometer allow quantified readings of the primary spectral colors and thereby enable the quality of the reproduction to be quanified in numerical terms. A densitometer produces the three primary color readings of red, green, and blue by separately sensing the light transmitted through separate red, green, and blue filters. That is to say, a red reading corresponds to the amount of standardized light passing through a standarized red filter after being reflected from a particular portion of the original image. Similarly, green and blue readings are produced by sensing the light transmitted through respective green and blue filters. The red, green, and blue filters are designed to respectively absorb one-third of the spectrum reflected from the image centered about the three primary colors red, green, and blue. As a result, primary color readings are a subtractive process which readings represent the remaining light transmitted through red, green, and blue filters.

In principle, the objective of color reproduction is to impress transparent coloring agents on white paper such that the coloring agents act as ideal primary color filters. Color agents are typically identified by their process colors of cyan, magenta and yellow corresponding respectively to red, green, and blue. Ideally these process colors act as perfect red, green, and blue filters which absorb only their designated portion of the spectrum and reflect or transmit the rest.

Unfortunately, practically available commercial coloring agents do not act as perfect red, green, and blue filters. That is to say, typical coloring agents are not strongly absorbing in one-third of the spectrum and strongly reflecting or transmitting in the other two-thirds of the spectrum For example, a typical cyan coloring agent which ideally would absorb light only in the red third of the spectrum, also absorbs light in the green portion and blue portion. Similarly, typical magenta coloring agents, while predominately absorbing light in the green part of the spectrum, also absorb in the red and blue portions, and yellow coloring agents absorb not only the blue portion of the spectrum but also in the green portion and the red portion. Hence, coloring agents are said to contain so-called "dirt" in reference to the fact that coloring agents do not perform as ideal red, green, and blue filters.

In order to quantify the non-ideal characteristics of coloring agents, each process color for a particular type of coloring agent can be quantified as having a certain proportion or percentage of the other two colors For example, cyan ink at a given density can be said to include a density level or percentage of magenta and yellow. That is to say, the green filtering action in the cyan ink can be characterized as a certain percentage of magenta in the cyan and the blue filtering action can be characterized as a certain percentage of yellow. Analogously, a magenta ink at a given density level can be said to include a certain percentages of cyan and of yellow, and the yellow ink can be said to have a certain percentages of magenta and cyan therein at a given density. Thus, when used in combination, each coloring agent contributes color to the other agent colors and the amount of contribution is different at different densities. This contribution effect must be taken into account in the color correction process.

The color correction process is additionally complicated by the fact that typical coloring agents experience so-called "linearity" failures such as "proportionality" failure and "additivity" failure. Proportionality failure refers to the fact that the color density of an agent color as measured by a densitometer does not increase linearly as the printing density of the coloring agent increases. That is, when the printing or coverage density of a cyan ink is increased, the measured cyan color density does not increase linearly therewith. Additionally, as the cyan ink density increases the magenta and yellow contributions also do not increase linearly.

Additivity failure refers to the fact that when two or more coloring agents are combined, the contribution one makes to the other does not increase or add linearly. For example, a cyan ink at a given density level has a certain cyan color density. A magenta ink at a given density level also contains a certain cyan density. If the cyan from the cyan ink and the cyan from the magenta ink combined linearly, the total cyan density reading of the combination would be a simple sum of the cyan density from the cyan ink and the cyan density contributed by the magenta ink. However, the resulting combination typically produces a net cyan density reading less than the sum of the two cyan sources. Thus, the cyan densities fail to add linearly.

As can be appreciated from the discussion above, the problems of color correction are substantial. In lithography, color correction is typically achieved by masking techniques in which the lithographer produces color separation masks used for producing printing plates which are designed to produce the desired color correction. The masking techniques, while generally effective, are also time consuming and expensive and may be prohibitively expensive for short runs of printing material.

Another color correction technique concerns the use of a microcomputer and associated electronic memory in which primary color reading data is stored therein corresponding to color charts of the coloring agents to be used in the reproduction process. The color agent charts for a given type of coloring agents are composed of patches of various combinations of the three colors of coloring agents at various color densities. If fifteen density steps of the three agent colors are used to make the charts, 3,375 combinations are possible with each producing corresponding red, green, and blue readings This data is typically arranged in the form of a table and the patch is selected having red, green, and blue readings which correspond most closely with the desired red, green, and blue readings.

As those skilled in the art will appreciate, a lookup table so constructed is limited in its color correction accuracy. For example, fifteen density steps for each process color produces increments of 6.67% for each step. With this large a gap between steps, the color correction may be inaccurate by at least this amount. If a minimum 3% accuracy is required, data must be produced for about 33 steps of density for each process color. This increases the number of color patches to almost 36,000. If accuracy of 1% is desired, data corresponding to nearly 1,000,000 patches must be stored.

Thus, to increase the color correction accuracy using such tables, the amount of memory space increases by the cube of the number of density steps. Additionally, six bytes of data must be stored for each patch corresponding to a byte of data for each process color in the combination and a byte of data for each primary color reading produced by that color patch. Thus, for 1% accuracy, at least 8,000,000 bytes of data must be stored. As those skilled in the art will appreciate, this volume of data becomes unwieldy to produce and enter, expensive to store, and time consuming to retrieve Furthermore, this data is usable only for a particular set of inks and must be re-entered for different inks. That is to say, a new look-up table is required if the inks are changed. As a result of these problems, electronic color correction is not in widespread use.

SUMMARY OF THE INVENTION

The problems as outlined above are solved by the system of the present invention. That is to say, the system hereof allows for highly precise and automatics color correction without the need for unwieldly amounts of data stored in memory.

Broadly speaking, the preferred system uses a microcomputer to receive input signals representative of the primary color readings for each image unit, pixel, or line of the image to be reproduced. In response, the microcomputer calculates final agent color densities as a function of color densities corresponding to the desired primary color readings, corresponding color contribution factors, and corresponding correction factors. The microcomputer then produces output signals representative of the final agent color densities for each agent color such as cyan, magenta and yellow. The output signals are preferably used in a reproduction unit capable of producing variable dot sizes of the coloring agent to produce the color densities of the coloring agents as represented by the output signals.

In particular forms, the system hereof also accounts for variations in the correction factors which occur at different density combinations of the coloring agents Advantageously, the system also provides for gray component removal for four color reproduction using cyan, magenta, yellow, and black in which the black replaces portions of the other colors to achieve the same color density result. The invention hereof also provides for black enhancement used to emphasize shadows.

Other preferred aspects of the invention will be explained hereinbelow.

BRIEF DESCRIPTION OF THE DRAWING FIGURES

DETAILED DESCRIPTION OF THE PREFERRED EMBODIMENT

Figure 1:
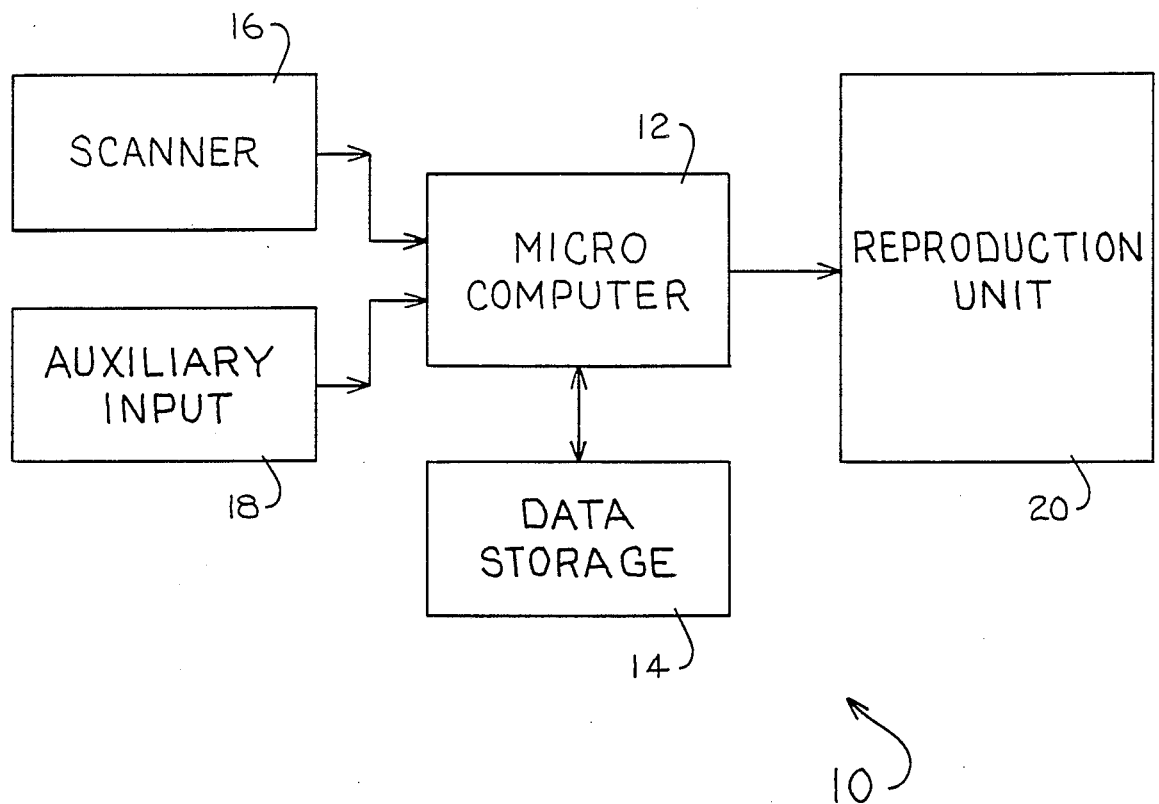
FIG. 1 is a schematic representation of the preferred components of the present invention.
Figure 2:
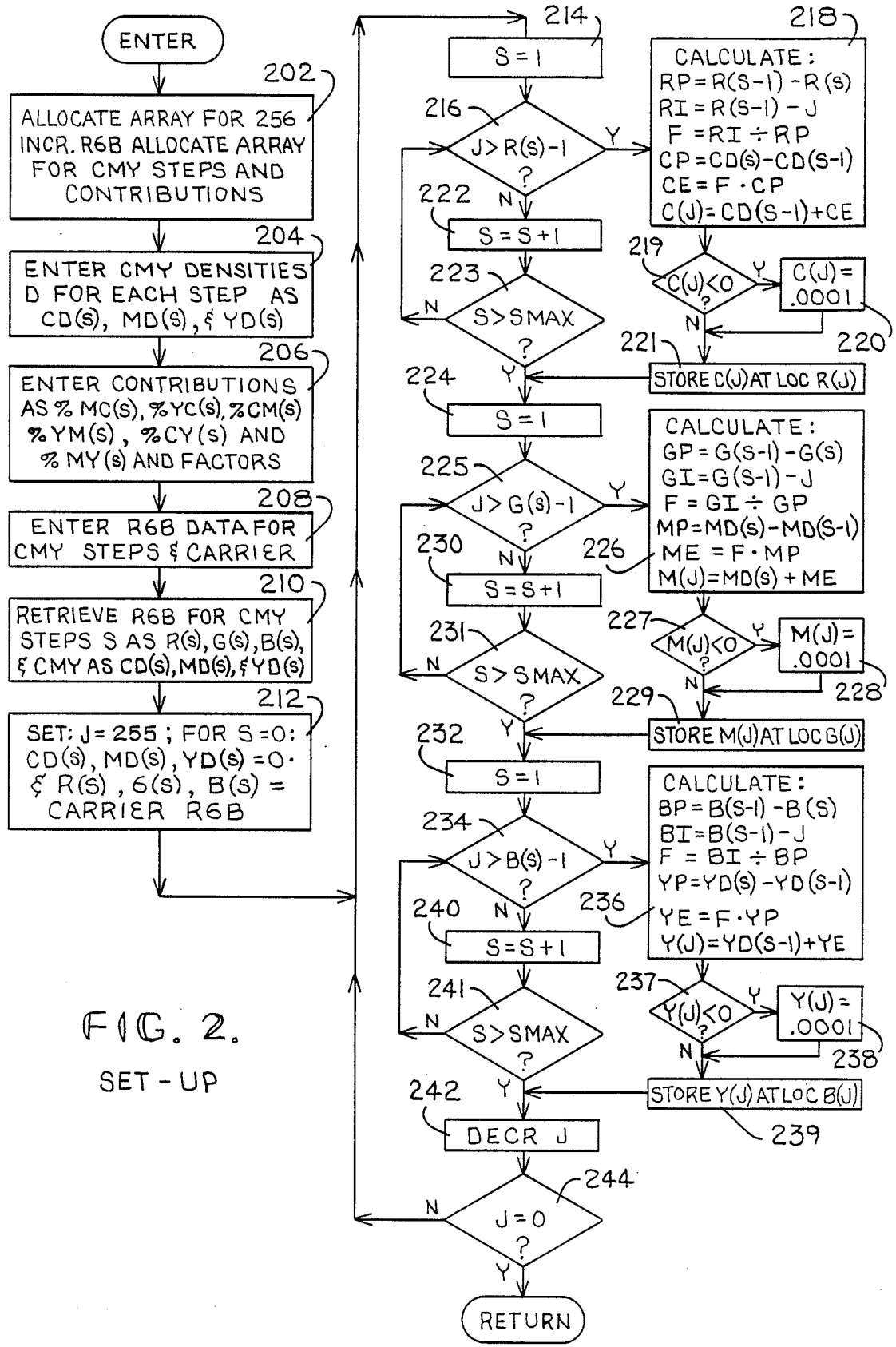
FIG. 2 is a computer program flowchart illustrating the SET-UP module of the computer program for operating the microcomputer of FIG. 1.

FIG. 1 illustrates preferred apparatus 10 including microcomputer 12 having associated data storage unit 14, scanner 16, auxiliary input device 18, and reproduction device 20.

Preferred microcomputer 12 is a WYSE 386 Computer Model WY3216-01 having an INTEL 80387 math coprocessor, INTEL ABOVE BOARD 286 with 2048 K expanded memory, a general purpose interface board for interfacing with the scanner, and an AT&T TARGA- 24 board. Microcomputer 12 also includes a conventional color monitor (not shown) such as Mitsubishi type 1371 and a conventional data entry keyboard (not shown).

Data storage unit 14 is conventionally interconnected with microcomputer 12 and preferably includes a 40 megabyte hard drive and two 1.2 megabyte floppy disk drives.

Preferred scanner 16 is a HOWTEK SCANMASTER manufactured by Sharp Electronics (Type JX 450). Scanner 16 is operable to scan a colored original image in order to produce corresponding red, green, and blue color density readings for each pixel which are presented as input signals representative of these RGB readings for reception and use by microcomputer 12.

Auxiliary input device 18 is an auxiliary source such as a conventional MACINTOSH microcomputer of input signals representative of desired red, green, and blue readings of an image to be produced by reproduction device 20. Scanner 16 and device 18 are both operable to provide input signals to microcomputer 12 representative of the desired RGB readings of the image to be reproduced. Scanner 18 develops these desired RGB readings by scanning a colored original image. Device 18, in contrast, provides output signals representative of the RGB readings as produced on the color monitor associated with the preferred MACINTOSH microcomputer, for example Those skilled in the art will appreciate that other devices may be used to supply input signals to microcomputer 12 such that the signals represent desired RGB readings or color density readings of the reproduced image.

Reproduction device 20 is preferably a three or four color reproduction device operable to produce varying dot sizes of each coloring agent in response to output signals from microcomputer 12. Preferred reproduction device 20 is film recorder such as a QZR-2 MATRIX brand capable of continuous gray tone film negative production. Other suitable reproduction devices include thermal printers, ink jet printers, and xerographic printers including laser printers operable for color printing and preferably for producing variable dot sizes as a function of desired color density.

FIGS. 2-5 are computer program flowcharts illustrating the preferred method of operating apparatus 10 and, in particular, microcomputer 12 for producing output signals representative of the final agent color densities of the coloring agents used in reproduction device 20. In preferred forms, the computer program is written using Borland International Turbo Basic Version 1.1, 1987. Additionally, other software used in operating microcomputer 12 includes AT&T - Flamingo Graphics Soft Vision RIO Version 1.2, AT&T - Flamingo Graphics RIO-PCS Version 1.33, and True Vision Image Processing Image Software from Island Graphics.

In implementing the method of the present invention, it is first desirable to set up data files particular to the coloring agents being used by reproduction unit 20 to reproduce a given image. These data files are set up for primary color readings, preferably and typically red, green, and blue (RGB), and the coloring agent colors, preferably and typically, cyan, magenta, and yellow (CMY).

In general, SET-UP module 200 produces respective lookup tables for 256 increments of RGB readings corresponding to respective CMY densities. CMY densities are typically read from color charts of coloring agents using a conventional densitometer with the CMY densities in 12 to 15 ink density increments or steps. The RGB readings from these CMY densities steps are matched with the corresponding RGB readings on the lookup table and other RGB readings are extrapolated to complete the lookup table. Additionally, SET-UP module 200 enters contribution factors as percent contribution of agent colors for each step of the CMY densities and also enters corresponding contribution correction factors explained further hereinbelow.

SET-UP module 200 enters at step 202 which allocates an array for 256 increments of RGB readings from zero to 255. Step 202 also allocates an array for the corresponding CMY density steps S and corresponding contribution factors at each agent color density step.

The program then moves to step 204 in which enters the CMY densities D for each step S from the color charts as CD(S), MD(S), and YD(S).

The program then moves to step 206 in which, for each CMY density step, the corresponding contribution factor to the other agent colors is entered. For example, for each cyan density step, the percent magenta in cyan (%MC) and the percent yellow in cyan (%YC) for that step are entered in association with that step. Similarly, for each magenta step, the percent cyan in magenta (%CM) and the percent yellow in magenta (%YM) at that density level is entered and for each yellow density step, the percent cyan in the yellow (%CY) and the percent yellow in the magenta (%YM) are entered.

In step 208, the corresponding RGB readings are entered for each CMY density step S. This produces a red reading for each of the cyan step, a green reading for each magenta step, and a blue reading for each yellow step. Additionally, the RGB readings for the reproduction carrier such as white paper are also entered which represent the respective upper limits of reproducable RGB readings The RGB readings for the carrier are necessary to define the upper RGB limits of the reproduced image That is to say, the reproduced image cannot produce RGB readings greater than the RGB readings of the carrier without any coloring agent thereon.

The program then moves to step 210 in which the program retrieves the respective RGB readings for each CMY step as R(S), G(S), and B(S). For example, for cyan density step 3, the corresponding red reading is denoted as R(3). Step 210 also retrieves corresponding cyan, magenta and yellow densities for step S designated as CD(S), MD($), and YD(S).

In step 212, the variable J is initially set at 255. Additionally, for step S=0, the corresponding CMY densities are defined as zero such that CMY densities increase as steps S increase. Conversely, the corresponding RGB readings for step S=0 are set at the respective RGB readings for the particular white paper or other carrier which were entered in step 208 which are the RGB readings when the coloring agent densities are zero.

The remaining portion of SET-UP module 200 extrapolates respective RGB readings to fill in the gaps between corresponding CMY density steps. That is to say, the RGB array is set up for a maximum of 256 increments but the initial data entered for corresponding CMY densities and corresponding RGB readings typically spans only 15 steps from the color charts. Accordingly, it is necessary to extrapolate the RGB readings between the CMY density steps. This extrapolation process in the remaining portion of SET-UP module 200 is done as a linear function between steps which, in the preferred embodiment, is sufficient to provide accurate results. As those skilled in the art will appreciate, a least squares method or other mathematical techniques could be used instead to produce a smooth curve through the data points from the color charts which might be desirable in some applications.

The extrapolation process for red and cyan begins at step 214 which sets S=1. The program then moves to step 216 which asks whether variable J is greater than the red reading at cyan step one minus one. During the first pass through these program steps, J=255 and the red reading at step 1 might equal 225, for example. Thus, J at 255 is greater than 225−1 and the answer in step 216 is yes. The program then moves to step 218 to conduct a series of calculations in order to extrapolate the red readings between step S and step S−1. In the initial step, with S=1, program step 218 extrapolates between density step 0 and density step 1.

In step 218, the program first calculates the red span RP according to the formula shown. The program then calculates the red increment RI between the next lowest step and the current value of J.

Next, the program calculates an incrementing factor F by dividing the red increment by the red span. The program then calculates the cyan span CP between step S and the previous step according to the formula shown and then calculates an extrapolated cyan amount as factor F times the cyan span. The program then calculates the cyan density at the J location in the RGB array as the density of the next lower step plus the cyan increment CE. In step 219 the program asks whether C(J) is less than zero which occurs when J is greater than the R reading when the cyan density is zero at density step zero. If yes, the program moves to step 220 to set C(J) at zero or a very low number, 0.0001 in the preferred program. After 220 or if the answer in step 219 is no, the program moves to step 221 in which the cyan density C(J) is then stored at location R(J) in the red array.

By way of example, the red reading at step 1 which is the first density step of cyan might equal 225 and R(O) might be 250 which is the red reading of the carrier. Thus, RP=250−225=25. If J equals 235, for example, RI=250−235 which equals 15, and incrementing factor F is 15÷25 which equals 0.60. If the cyan density at step 1 is 0.11, for example, then the cyan span CP between step 0 and step 1 is also 0.11. Accordingly, the cyan extrapolated value CE is 060×0.11 or 0.066. Thus, the cyan density at location J equals the cyan density at step 0 which is zero plus 0.066 or rounded to 0.07. The cyan density value is then stored at location R(225) in the red array. Thus, input signals representing a red reading of 225 correspond to a cyan color density of 0.07. Input red readings greater than 250 would have a corresponding cyan density of zero (or 0.0001 as preferred from step 220).

If the answer in step 216 is no indicating that variable J has been decremented below the red reading value at cyan density step S, the program moves to step 222 which increments variable S and then moves to step 223 which asks whether variable S is greater than the maximum value of S. In the example above, the maximum value of S is 15 corresponding to the 15 steps on the cyan density color chart. If the answer in step 223 is no, the program loops back to step 216.

If the answer in step 223 is yes or after step 221, the program moves to step 224 which again sets variable S equal to 1. Steps 224 through 231 perform the same calculations for the green and magenta as for red and cyan in order to extrapolate the magenta readings for the green array in the same manner as steps 214–223 for red and cyan.

Similarly, steps 232–241 perform the same steps and calculations for blue and yellow.

If the answer in step 241 is yes or after step 239, the program moves to step 242 to decrement variable J and then moves to step 244 which asks whether variable J equals zero. If no, the program loops back to step 214 to complete steps 214–241 for the new value of J. In this way, the program fills in corresponding CMY extrapolated densities in respective RGB arrays for each value of J. When complete, each RGB array presents a complete set of corresponding CMY densities—up to 256 CMY density increments in the preferred embodiment. In this way, rather than working with only 15 density increments for each agent color, up to 256 increments are available which allow calculation of final density readings within about 1% of the original.

When the answer in step 244 is yes, the operation of SET-UP module 200 is complete.

As discussed above, SET-UP module 200 is executed once for each set or type of coloring agents being used in reproduction unit 20. Thus, once the corresponding CMY densities have been calculated for each RGB increment in the corresponding arrays, SET-UP module 200 need not be again executed. As a matter of design choice, the RGB arrays can be set up by the end user by physically taking a set of RGB readings and corresponding CMY densities for each of the corresponding CMY densities from color charts of the coloring agents with which the reproduced image is to be printed which typically involves 15 measurements for each coloring agent for a total 45 measurements. In the alternative, the array and factors can be provided on a floppy disk or read-only-memory (ROM) chip from the manufacturer of the coloring agents.

Figure 3A:
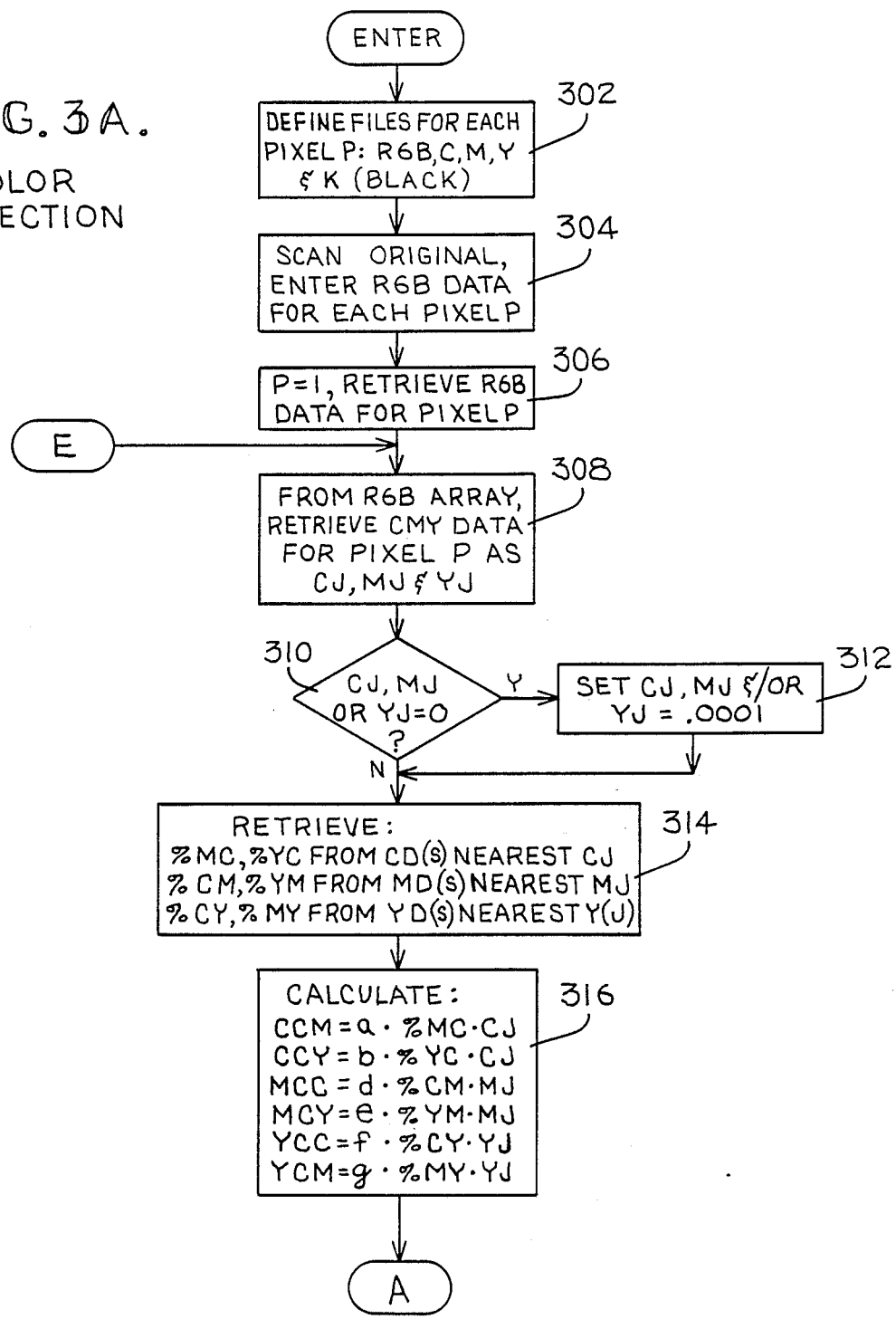
FIG. 3A is a computer program flowchart illustrating the first part of COLOR CORRECTION module of the computer program.
Figure 3B:
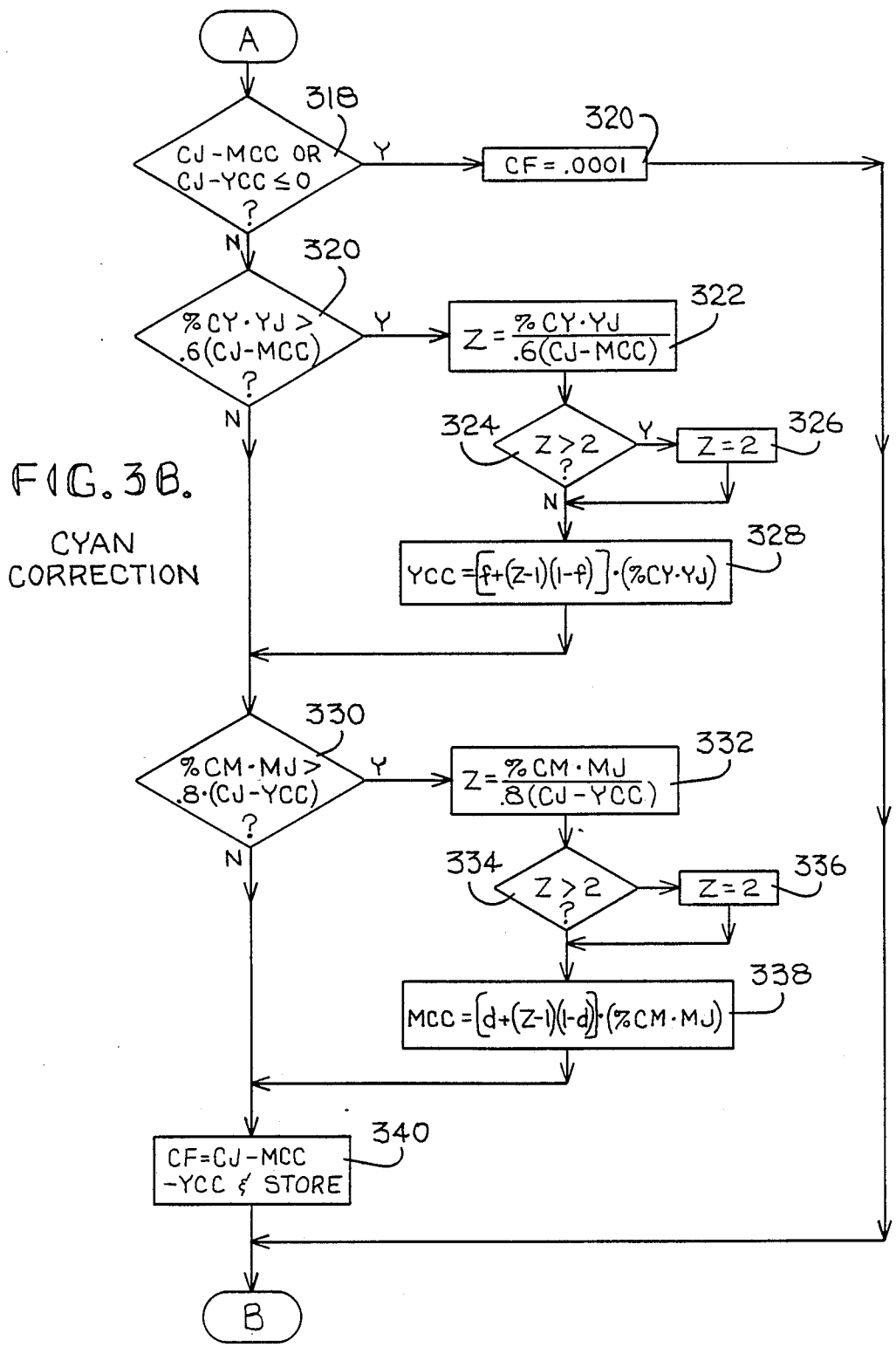
FIG. 3B is a computer program flowchart of the CYAN CORRECTION submodule of the computer program.
Figure 3C:
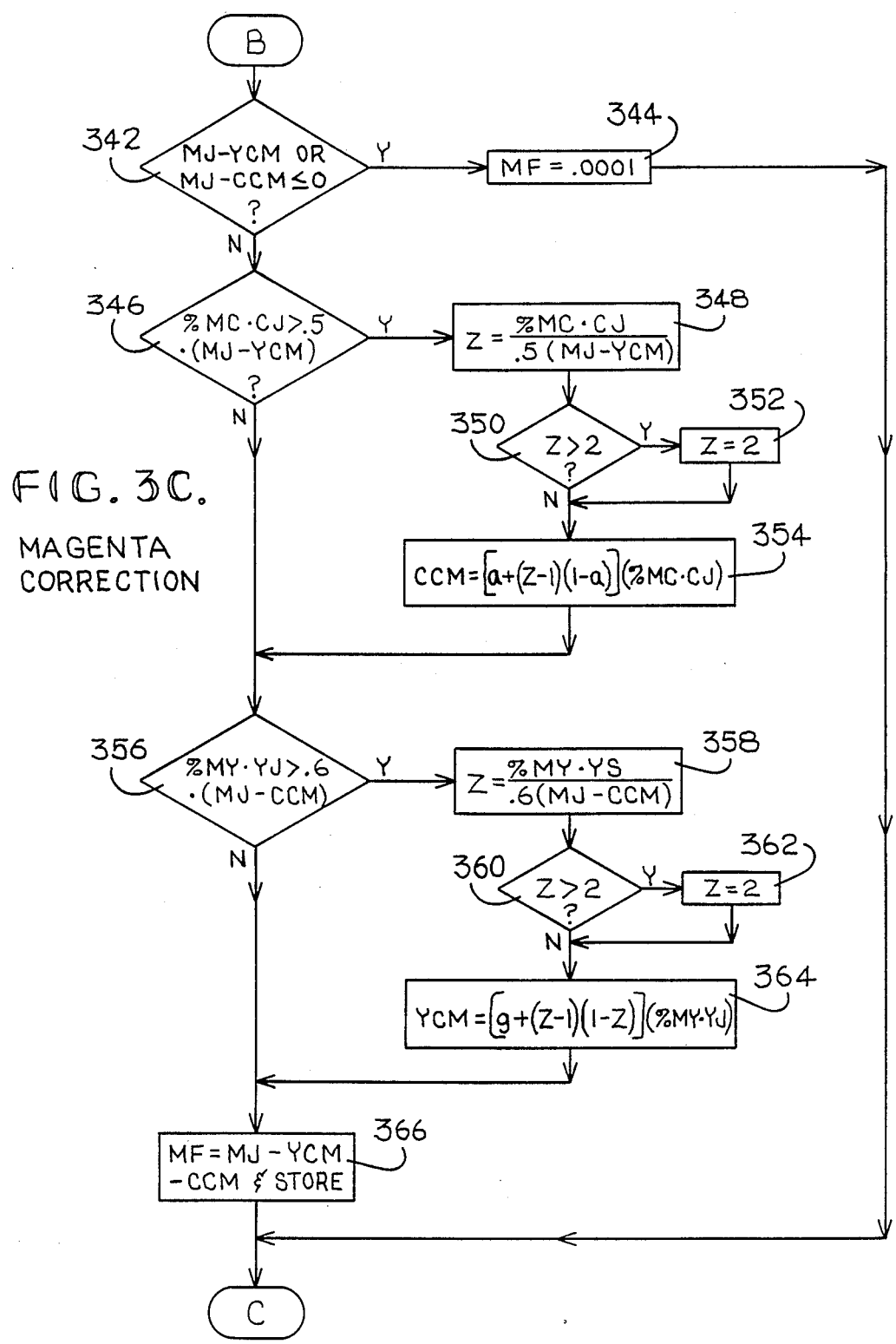
FIG. 3C is a computer program flowchart of the MAGENTA CORRECTION submodule of the computer program.

FIGS. 3A, B, C, and D illustrate the computer program flowchart for receiving input signals representative of RGB data and for producing output signals representative of color corrected CMY densities of the reproduced image in order to produce corresponding RGB readings.

Figure 3D:
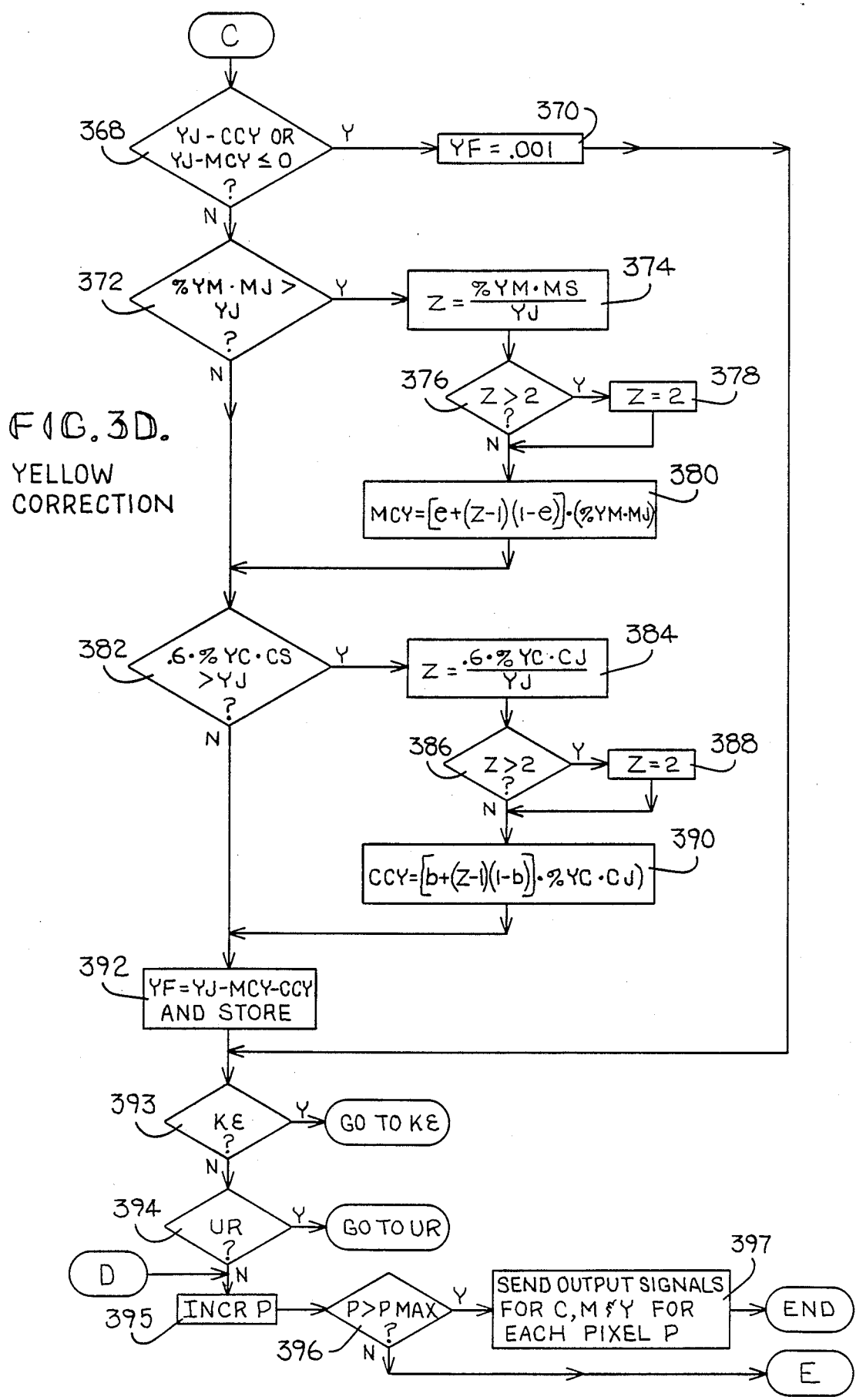
FIG. 3D is a computer program flowchart illustrating the YELLOW CORRECTION submodule of the computer program.

FIGS. 3A–D illustrate COLOR CORRECTION module 300 which includes a CYAN CORRECTION submodule (FIG. 3b), a MAGENTA CORRECTION submodule (FIG. 3c), and YELLOW CORRECTION submodule (FIG. 3d).

Referring now to FIG. 3A, COLOR CORRECTION module 300 performs a set of initial calculations based on the input signals representative of the RGB readings of the colored original, the contribution factors to each coloring agent from the others, and corresponding correction factors.

The correction factors to be entered in step 206 (FIG. 2) are specific to the particular coloring agents being used. J.A.C. Yule, in a book entitled "Principles of Color Reproduction" published by John Wiley & Sons, New York, which is hereby incorporated by reference, suggested that correction factors could be calculated using a series of simultaneous equations. These equations are identified as equations 10.24 on page 278 of the Yule book. Solving of these simultaneous equations is not usually practical because of the number of independent variables that must be factored into the attempted solution. When simplified, the equations may be represented as:

$$C_T = C_C + aM_c + bY_C$$

$$M_T = M_M + dC_m + eY_M$$

$$Y_T = Y_Y + fC_y + gM_Y$$

wherein the total color density of an agent color is expressed in terms of the contribution from the coloring agent of that color plus the contribution to that agent color from the other agent colors. For example, the first equation recites that the total cyan color density $C_t$ equals the sum of: the cyan contribution from the cyan coloring agent $C_C$, a correction factor "a" times the magenta coloring agent contribution to cyan $M_c$, and a correction factor "b" times the yellow contribution to cyan $Y_c$. Similarly, the magenta total $M_T$ is expressed in terms of the magenta agent contribution to magenta $M_M$ plus correction factors "d" and "e" times the respective contributions to magenta from the cyan and yellow coloring agents. The total yellow density $Y_T$ is expressed as a function of the yellow coloring agent contribution of the yellow $Y_Y$ plus correction factors "f" and "g" respectively times the cyan and magenta coloring agent contributions to yellow.

Yule and others made a concerted effort to quantify the linearity failures which occur when coloring agents are combined in practice by resorting to equations such as those referenced above. As pointed out though, the usefulness of these equations requires knowledge of a significant number of independent variable correction factors including at least a, b, d, e, f, and g, all of which are different for different coloring agents. These correction factors necessarily change as the density of combined coloring agents vary. This has heretofore prevented practical application of Yule-type equations in solving color correction problems.

On the other hand, if the independent variables, a to g inclusive, are first empirically determined by taking density readings at strategic locations on color charts of the coloring agents to ultimately be used, then it is possible to solve the simultaneous equations. For example, as an initial starting point, correction factor "a" can be determined by reading a previously prepared color chart patch having a known density of cyan and magenta and no yellow and solving the first equation above for "a" using these measured values. A color patch is then read using a densitometer of known densities of cyan and yellow with no magenta. These values may be used in the first equation to solve for "b". With these starting points for correction factors "a" and "b", color patches may then be read for a cyan density having known densities of all three colors—cyan, magenta, and yellow. If the equation does not balance, factors "a" and "b" are altered until the equation does balance. This process is repeated for the other two equations until values have been determined for factors d, e, f, and g. In a typical set of match print inks, these correction factors have been found to be 0.6, 0.6, 0.4, 0.4, 0.5, and 0.6 respectively for a-g inclusive and yield acceptable results.

It has further been found though that the values of the correction factors vary somewhat over a given range of densities. Within certain limits, as will be explained further hereinbelow, these variations are small enough so that they do not significantly affect the precision of the color correction process within certain density limits. That is to say, even with these slight variations, the precision of the color correction process is well within acceptable limits and significantly superior to known prior art techniques.

The three modified equations recited above can be rearranged as follows:

$$C_C = C_T - aM_c - bY_c$$

$$M_M = M_T - dC_M - eY_M$$

$$Y_Y = Y_T - fC_Y - gM_Y$$

In this form, these equations state that the color density of an agent color equals the total color density for that color less the contributions from the other colors. In other words, if an initial color density is known, and if the contributions to that density from the other colors are known, then the required color density of the corresponding coloring agent can be derived. In the preferred embodiment, $C_T$, $M_T$, and $Y_T$ correspond to the respective initial color densities CJ, MJ, and YJ from the RGB arrays and $C_c$, $M_M$, and $Y_Y$ correspond to the final agent color densities CF, MF, and YF as will be explained further hereinbelow.

The program enters COLOR CORRECTION module 300 at step 302 which defines a set of files for each pixel P or image unit of the image to be reproduced. As will be explained further hereinbelow, the output signals from microcomputer 12 represent agent color densities for each image unit, pixel, or line of the reproduced image. For example, in lithographic art, halftone resolution is expressed in terms of so-called "lines per inch". Image resolution can also be expressed in terms of pixels per inch with the term "image unit" as used herein being a generic term for pixels, lines, or the like. The particular scanner 22 being used may be capable of resolving an original image with a resolution greater than that of the particular reproduction unit 20 being used, or greater than that needed or desired.

In such a case, it may be desirable to average pixel subsets of the RGB data represented by the input signals to microcomputer 12 to provide correspondence with the resolution of the reproduced image. For example, if the final image is to have a resolution of 150 lines per inch and the input provides resolution of 300 per inch, the RGB data from four adjacent input pixels can be averaged to present the data corresponding to a single larger reproduction image unit.

Step 302 sets up files for input RGB data, final CMY density data, and a file K for black data corresponding to either GRAY COMPONENT REMOVAL or BLACK ENHANCEMENT as will be explained in connection with FIGS. 4 and 5.

The program then moves to step 304 to receive the input signals representative of the RGB data for each pixel P which data represents the desired RGB data for the reproduced image. In the preferred embodiment, program step 304 corresponds to the physical operation of placing the colored original drawing in scanner 16 for scanning thereby and for generating and transmitting the input signals to microcomputer 12. Equivalently, program step 304 corresponds to the reception of input signals representative of the RGB data from some auxiliary source such as a MacIntosh computer or data already stored in memory, or some other input signal source such as a xerographic copier capable of supplying input signals representative of primary color readings or equivalent color densities.

Step 306 sets variable P equal to 1 and retrieves the RGB data corresponding to pixel P.

The program then moves to step 308 which retrieves the respective CMY initial color densities corresponding to the input RGB data from the corresponding RGB arrays. The corresponding CMY initial color densities are represented as CJ, MJ, and CJ respectively.

The program then moves to step 310 which asks whether any of the corresponding CMY densities CJ, MJ, or YJ are equal to zero. If such is the case, the program moves to step 312 which sets the density for that color at a extremely low number corresponding to zero. That is to say, in the particular programming language used in the equation used further hereinbelow, the variable CJ, MJ, or YJ are not set exactly equal to zero but set at a very low number to avoid computational problems.

If the answer in step 310 is no or after step 312, the program moves to step 314 to retrieve the contribution factors corresponding to the color densities retrieved in step 308. More particularly, the contribution factors are expressed as percent magenta in cyan %MC, and percent yellow in cyan %YC which preferably correspond to the cyan density step S nearest the cyan density CJ retrieved in step 308. Similarly, the percent cyan in magenta %CM and the percent yellow in magenta %YM for the magenta density MJ are retrieved as the corresponding contribution factor of the magenta density step having a density value nearest retrieved density MJ. Similarly, the percent cyan in yellow %CY, and percent magenta in yellow %MY associated with the yellow density step having a density value nearest the density YJ are retrieved.

As those skilled in the art will appreciate, these contribution factors as measured from a color chart of the coloring agents also vary non-linearly. For example, the percent magenta in cyan may be higher at a low density cyan density step and lower at a high density cyan density step. Program step 314 retrieves the contribution factors associated with the density step nearest the density retrieved in step 308. Such a retrieval treats the variations in contribution factors between density steps as disjointed functions. In the preferred embodiment, this approximation is close enough to allow precise color correction. As a matter of design choice, however, the contribution factors can be extrapolated in a manner similar to the color density extrapolation performed in SET-UP module 200 if a closer approximation is desired. Furthermore, if an even closer approximation is desired, the least squares method of calculating the contribution factors can also be performed such that a set of 256 contribution factors corresponding to each of the 256 densities is produced.

The program then moves to step 316 which calculates two contribution amounts for each agent color as a function of the corresponding contribution factor, correction factor, and initial color density. As explained above, the contribution correction factors a, b, d, e, f, and g are specific to the coloring agents being used in reproduction unit 20. Similarly, the contribution factors retrieved in steps 314 are also specific to the coloring agents being used as they are measured directly from the color charts of the coloring agents. The contribution amounts calculated in step 316 are expressed as cyan contribution to magenta CCM, cyan contribution to yellow CCY, magenta contribution to cyan MCC, magenta contribution to yellow MCY, yellow contribution to cyan YCC, and yellow contribution to magenta YCM.

With the calculations complete in step 316, the program is ready to move on to the cyan, magenta, and yellow correction submodules in order to calculate final densities for each coloring agent.

The program enters the CYAN CORRECTION submodule (FIG. 3b) at step 318. This step is included to determine whether the contribution to cyan from the magenta coloring agent or the yellow coloring agent is greater than the initial cyan density CJ. If such is the case, then no cyan coloring agent need be included in the final combination. Accordingly, the final cyan density CF for the cyan coloring agent is set at zero or in the preferred case at an extremely low value in step 320.

If the answer in step 318 is no, the program moves to step 320 which asks whether the cyan contribution from the yellow coloring agent is greater than a predetermined factor (in this case 0.6) times the cyan contribution to the cyan without the magenta contribution to cyan. In other words, if the contribution to cyan from the yellow coloring agent is greater than a predetermined amount, then the actual yellow contribution to cyan (YCC) must be recalculated, recalling that the yellow contribution to cyan (YCC) was calculated in step 316 as a function of correction factor "f". As discussed above, this correction factor is generally acceptable except for coloring agent blends at high densities such that the yellow agent contributes substantially to the percent of cyan. If such is the case, then correction factor "f" does not produce precise color correction results and should be recalculated. Accordingly, the yellow contribution to cyan (YCC) must be recalculated because with this great of a cyan contribution from the yellow, the yellow contribution to cyan becomes more dominant and the resulting additivity failure is less. That is, for example, instead of a 60% correction, 80% may be more precise.

Thus, if the answer in step 320 is yes, indicating that the yellow does contribute a substantial amount to the cyan as indicated by the formula in step 320, the program moves to step 322 which calculates an interim variable "Z" according to the formula shown. Variable "Z" can be thought of as a ratio between the yellow contribution to cyan and a percent of the cyan contribution to cyan without the effect of the magenta contribution to cyan.

The program then moves to step 324 which asks whether variable "Z" is greater than 2. If yes, the program moves to step 326 to set "Z" equal to 2 with this being a preferred upper limit for "Z".

If the answer to step 324 is no, or after step 326, the program moves to step 328 to calculate a new value for the yellow contribution to cyan YCC according to the formula shown in step 328. An inspection of this formula indicates that the term enclosed in brackets is a new calculation for correction factor "f" in the corresponding formula of step 316.

As those skilled in the art will appreciate, the multiplication factor 0.6 used in steps 320 and 322 and the addition factor 0.7 used in step 328 are specific to the coloring agents being used. In other words, by using sample patches on a set of color charts of the coloring agents, and by using formulas in steps 320, 322, and 328, one can determine the appropriate factors for use in steps 320, 322, and 328. The particular factors 0.6 and 0.7 are preferred for match print inks.

If the answer in step 320 is no, or after step 328, the program moves to step 330 which begins a series of steps similar to steps 320–328 in order to recalculate correction factor "d" from step 316 if necessary. In other words, if the magenta contribution to cyan is greater than 0.8 times the cyan contribution to cyan without the effects of the yellow contribution to cyan, then it is necessary to recalculate correction factor "d". With magenta in the use of match print inks, it has been found that the correction factor "d" needs to be recalculated if the magenta contribution to cyan is greater than 80% of the cyan contribution to cyan without the effects of yellow contribution to cyan. This factor 0.8, is in contrast to the factor 0.6 used in step 320 and is, as explained, readily derived.

If the answer in step 330 is yes, the program moves to step 332 to again calculate interim factor "Z" accordingly to the formula shown and similar to step 322. Steps 334, 336, and 338 are similar to steps 324–328 as explained above except that step 328 recalculates the contribution of the amount of the magenta contribution to cyan (MCC) by recalculating correction factor "d" according to the term as shown in brackets in step 338.

If the answer in step 330 is no, or after step 338, the program moves to step 340 which calculates the final cyan color density CF according to the formula as shown. Basically this formula states that the final color density of the cyan coloring agent is equal to the initial cyan color density CJ corresponding to the desired red reading less the magenta contribution to cyan (MCC) and less the yellow contribution to cyan (YCC). This formula incorporates magenta and yellow contributions to cyan as originally calculated in step 316 or as recalculated in steps 328 or 338 as explained above. Also as explained above, if the magenta or yellow contribute sufficiently to the cyan such that no cyan coloring agent is needed, the final cyan density is set at a very low number in step 320 and step 340 is bypassed.

After step 340, the program moves to step 342 (FIG. 3C) which initiates the calculations for the MAGENTA CORRECTION submodule. This submodule including steps 342–366 performs the same calculations for magenta as were performed for cyan in steps 318–340 resulting in a final density for the magenta coloring agent as calculated in step 366. Steps 354 and 364 respectively recalculate the cyan contribution to magenta and the yellow contribution to magenta by recalculating contribution correction factor "a" and correction factor "g".

After step 366, the program moves to step 368 (FIG. 3D) to initiate the calculations for the yellow correction in steps 368 through 392 in the same manner as for magenta and cyan. Note that in steps 372, 374, 380, 382, and 384 that the preferred form of the formulas is slightly different than the corresponding steps for the cyan and magenta calculations. The difference in the form of equations is primarily due to the fact that typically available yellow coloring agents such as process inks are not as "dirty" as magenta and cyan and thereby function more nearly like an ideal blue filter. As those skilled in the art may appreciate, however, with other process inks or toners or other types of coloring agents, such may not be the case and the more general form of the formulas as used for calculating cyan and magenta may be necessary.

After step 392, the program has completed the calculations for the final color density for each coloring agent and has stored these values for pixel P. After step 392, the program moves to step 393 which asks whether pixel P is to include enhancement black as will be explained in connection with FIG. 4. If yes, the program goes to BLACK ENHANCEMENT module 400 and executes that submodule and reenters the program at entry point "D".

If the answer in step 393 is no, the program moves to step 394 which asks whether GRAY COMPONENT REMOVAL module 500 (FIG. 5) is to be executed as will be explained further hereinbelow. If yes, the program executes module 500 and then returns at entry point "D". As those skilled in the art will appreciate, both enhancement black and undercolor removal are typically not both used. Additionally, the particular reproduction unit 20 being used may not have the capability of a four color process incorporating black in which case the answers in steps 393 and 394 are both no.

If the answer in step 394 is no or after execution of modules 400 or 500, the program moves to step 395 which increments pixel variable P. The program then moves to step 396 which asks whether P exceeds the maximum number of pixels in the reproduced image. If no, the program loops back to step 308 (FIG. 3A) to reexecute steps 308–396 for the next pixel.

If the answer in step 396 is yes, the program moves to step 397 to send output signals to reproduction unit 20 representative of the CMY densities for each coloring agent for each pixel. In the alternative, the output signals can be sent instead for conversion to data for storage in data storage unit 14. That is to say, the CMY data can be downloaded onto a floppy disk, for example, and stored thereon. As preferred, the output signals represent the CMY color densities which can be converted to represent percent dot sizes as will be explained further hereinbelow.

Figure 4:
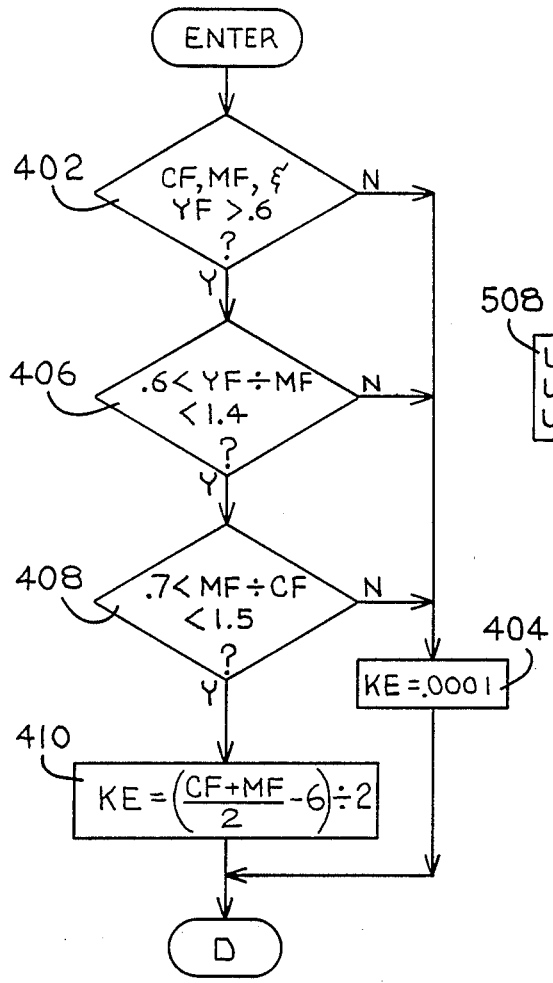
FIG. 4 is a computer program flowchart illustrating the BLACK ENHANCEMENT module of the computer program.

FIG. 4 illustrates BLACK ENHANCEMENT module 400. As those skilled in the art will appreciate, if a four color process is desired or available, black is often added for enhancing shadows on the reproduced image.

Module 400 enters at step 402 which asks whether the final densities of the cyan, magenta, and yellow are all greater than 0.6. If no, indicating that this particular pixel is not densely colored, black enhancement is not appropriate and the program moves to step 404 to set the black enhancement level KE essentially at zero or as in the preferred case at a very low level as indicated.

The selection of the factor 0.6 in step 402 is a matter of design choice as to what level the operator wishes black enhancement to start.

If the answer in step 402 is yes, the program moves to step 406 which asks whether the ratio between the final yellow density and the final magenta density is between 0.6 and 1.4. If the answer is no, indicating that the yellow density is low as compared to the magenta density, the program moves to step 404. If the answer in step 406 is yes, the program moves to step 408 which asks whether the ratio between the final magenta density and the final cyan density is between 0.7 and 1.5. As those skilled in the art will appreciate, the selection of the ranges for steps 406 and 408 is a matter of design choice. If the answer in step 408 is no, the program moves to step 404.

If the answer in step 408 is yes, the program moves to step 410 to calculate the amount of enhancement black KE according to the formula shown. This formula sets upper and lower limits on the amount of enhancement black. These limits can be modified as a matter of design choice. After steps 410 or 404, the program loops back to step 395 (FIG. 3D).

Figure 5:
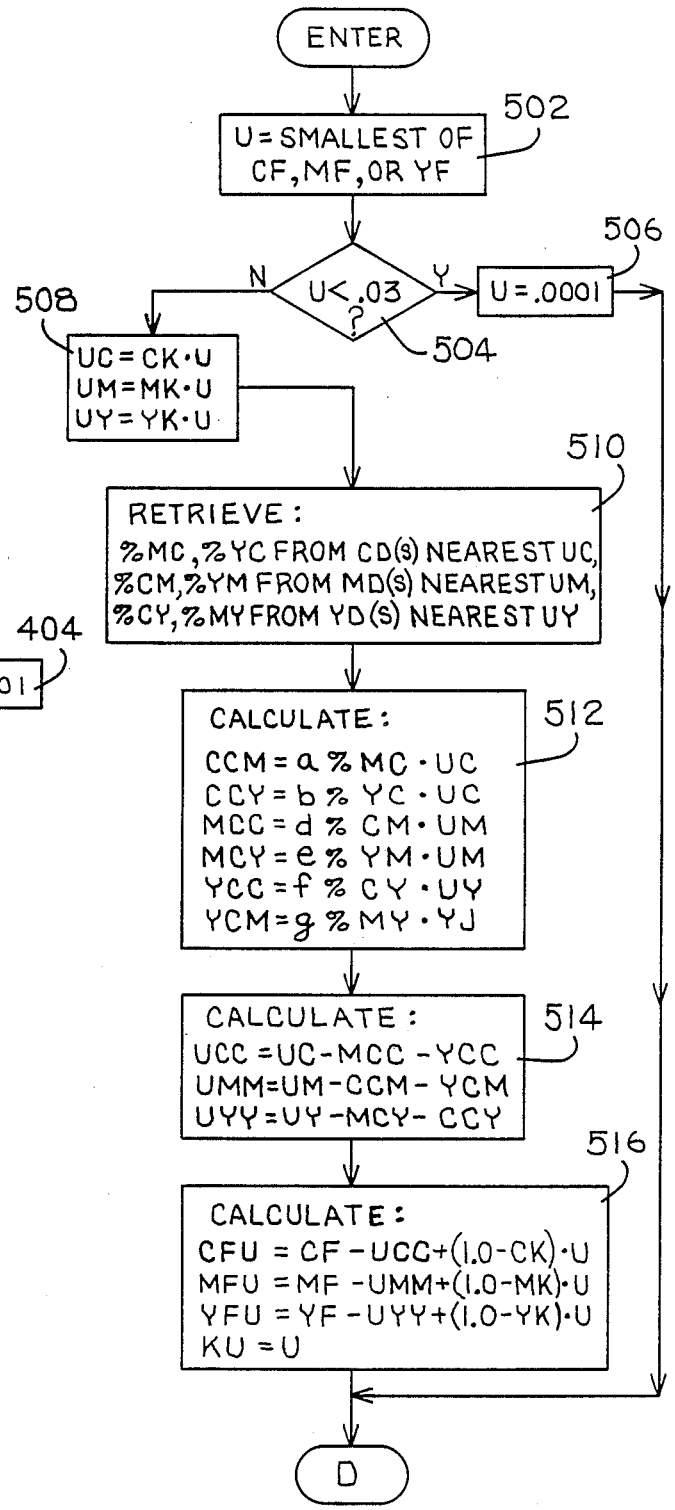
FIG. 5 is a computer program flowchart of the GRAY COMPONENT REMOVAL module of the computer program.

FIG. 5 illustrates GRAY COMPONENT REMOVAL module 500. As those skilled in the art will understand, typical black process coloring agents can be thought of as being composed of cyan, magenta and yellow. Thus, black can be substituted for respective portions of the cyan, magenta, and yellow coloring agents which may be desirable as a cost reduction technique since black coloring agents typically cost less. These replaced portions of cyan, magenta, and yellow together represent a gray component which is removed and replaced by the black.

The program enters module 500 at step 502 which sets the variable "U" equal to the smallest of the CMY final densities. Since black can substitute for CMY, the smallest of the three represents the maximum level of black to used to replace the underlying cyan, magenta, and yellow.

The program then moves to step 504 which asks whether U is less than 0.03. If yes, indicating that the level of black is too small to be effective, the program moves to step 504 to set U equal to zero or an extremely low number as illustrated. If the answer in step 504 is no, the program moves to step 508 to set the variables undercolor cyan (UC), undercolor yellow (UY), and undercolor magenta (UM) equal to respective factors CK, MK and YK times "U".

With many black coloring agents, the black is balanced, that is, includes substantially equal CMY densities. If not, as with MATCH PRINT black, the imbalance needs to be taken into account when calculating the gray component portions of the final densities. For example, if the black coloring agent presents relative densities of 92% cyan, 100% magenta, and 96% yellow, then it is not effective for replacing all of the gray component cyan and yellow. Accordingly, the relative portions of CMY are defined as respective factors CK (0.92), MK (1.0), and YK (0.96). These are multiplied by "U" for the undercolor cyan (UC), magenta (UM), and yellow (UY).

The linearity failures as discussed above also come into play with black. Accordingly, for precise color correction using black, the program takes the linearity failures into account. After step 508, the program moves to step 510 to retrieve the contribution factors of the respective CMY steps having densities nearest the densities of UC, UM, and UY. The program then moves to step 512 to calculate the contribution amounts as indicated for the gray component densities of cyan, magenta, and yellow. This step is necessary because the densities do not vary linearly and so a mere substitution of black for corresponding densities of cyan, magenta, and yellow is not accurate. The calculations in step 512 are similar to those in steps 316 (FIG. 3A). The correction factors a, b, d, e, f, and g are preferably the same values as those in step 316 and are specific to the coloring agents being used.

The program then moves to step 514 to calculate the final densities present in the black according to the formula as shown which are analogous to the formulas in steps 340 (FIG. 3B), 366 (FIG. 3C), and 392 (FIG. 3D).

The program then moves to step 516 to calculate the densities of the CMY coloring agents after gray component removal according to the formulas as shown. That is to say, step 516 calculates the new final densities for cyan, magenta, and yellow represented by CFU, MFU, and YFU respectively after the gray component portion has been removed. Step 516 also sets the black density KU equal to variable "U".

As discussed above, if the black coloring agent is not balanced, it is not totally effective for replacing all of the gray component portions of CMY. As a result, residual amounts must be added back in step 516 as residual cyan [(1.0−CK)·U], residual magenta [(1.0−MK)·U], and residual yellow [(1.0−YK)·U].

After step 516 or 506, the program loops back to steps 395 (FIG. 3D).

In use, the final color densities of the agent colors of cyan, magenta, and yellow as represented by the output signal may be converted to a form suitable for use by the particular reproduction unit 20 such as percentage dot sizes in increments of 1% from zero to 100. For example, the lowest coverage density of a coloring agent might be expressed as a 0% dot and the maximum single impression density as a 100% dot. As used herein, the term color density refers to density as typically measured by a densitometer to express cyan color density, for example, and the term "coverage density" refers to the coverage of a given image unit per unit area by the coloring agent. Those skilled in the art will appreciate that the coverage density can be expressed in other units and can be expressed in fewer or greater increments. It is preferred that reproduction unit 20 produce an image with a resolution of at least 150 image units per inch such as 150 halftone lines per inch.

The output signals are useful in the context of a film recorder. In such an application, the RGB data corresponding to the final CMY color densities are represented by the output signals as retrieved from the RGB arrays. Using a film recorder, a continuous tone negative can be produced using the output signals which represent the cyan separation. Similarly, continuous tone negatives can be produced from the magenta and yellow output signals representing the magenta and yellow separations respectively. The negatives are then enlarged or reduced on an enlarger to produce halftone line screens to produce respective halftone positives from which respective cyan, magenta, and yellow plates are produced for three color printing (and a black plate if four color is used). Such use simplifies the entire lithographic process and eliminates the need for more expensive machines as those skilled in the art will appreciate. A film recorder can be set up to produce variable dot sizes so that the line screen is generated directly from the film recorder. Film recorder technology also lends itself to laser use for a finer, sharper dot.

As those skilled in the art will appreciate, the components of apparatus 10 can be incorporated into a single unit as part of a color xerographic copier. In such a configuration, it is preferred that the data specific to the toners used in the copier would be stored in a replaceable ROM such that if a different type of toner is used, a replacement plug-in ROM module containing the program can be conveniently substituted to provide the new data for use in the color correction calculations. As explained above, the data specific to the coloring agent includes the RGB arrays with the corresponding CMY densities, the contribution factors, the correction factors, and the multiplication and addition factors discussed in connection with FIGS. 3B-D. Additionally, this data includes data for a black toner if a four color process is used as discussed in connection with FIGS. 4 and 5.

The present invention contemplates many variations in the preferred embodiments described herein. For example, the preferred computer program can be implemented in a variety of different types of computers other than the preferred microcomputer 12 such that any processing unit adequate to conduct the steps of the program would be acceptable. Additionally, as those skilled in that art will appreciate, all of the logic functions illustrated in the program steps of FIGS. 2-5 could be implemented by dedicated hardware such as a custom-made semiconductor chip. That is to say, rather than implementing the method of the present invention in terms of software, a custom chip incorporating the appropriate gates, shift registers, counters, and so forth could be used although such is not preferred because of the relative difficulty and expense of making changes and modifications in the operating steps.

Having thus described the preferred embodiment of the present invention, the following is claimed as new and desired to be secured by Letters Patent:

1. A method of operating a processing unit for producing output signals representative of agent color densities of coloring agents such as process inks or toners, to be used in producing a color-corrected image unit of an initial image unit using the coloring agents, the processing unit including memory means for storing selected data, the coloring agents presenting respective agent colors, said method comprising the steps of:
  (a) entering input signals into the processing unit which are respectively representative of color readings of the image unit to be finally produced using said coloring agents;
  (b) determining initial color densities that correspond relatively to said color readings entered into the processing units;
  (c) retrieving from the memory means previously stored data representative of respective contribution factors corresponding to the contribution to each of the agent colors from each of the other coloring agents;

(d) retrieving from the memory means previously stored data representative of certain predetermined nonlinearity correction factors which are representative of the particular coloring agents to be used in producing said image unit;

(e) calculating in said processing unit, for each agent color of a respective coloring agent, a contribution amount to each of the other agent colors as a function of the effect thereon of the respective initial color density, contribution factor, and correction factor;

(f) calculating in said processing unit, for each agent color, a final agent color density as a function of its corresponding initial density and the contribution amounts from the other coloring agents; and (g) producing output signals representative of each of said final agent color densities.

2. The method as set forth in claim 1, further including the step of repeating steps (a) through (g) for each of the image units.

3. The method as set forth in claim 1, step (a) including the step of entering said input signals from a scanner.

4. The method as set forth in claim 1, the processing unit including a microcomputer.

5. The method as set forth in claim 1, said final color agent densities corresponding to halftone dot sizes of respective coloring agents.

6. The method as set forth in claim 5, further including the step of receiving said output signals in a reproduction unit having means for producing representative halftone dot sizes of the respective coloring agents corresponding to said output signals.

7. The method as set forth in claim 1, further including after step (e) the step of recalculating certain ones of said contribution amounts when the contribution to a given color from at least one of the other coloring agents exceeds a predetermined level.

8. The method as set forth in claim 7, said recalculating step including the step of calculating new correction factors for said given color.

9. The method as set forth in claim 1, further including after step (f) the steps of calculating the amount of gray component removal color to be used in place of predetermined portions of said final agent color densities, and
   reducing said final agent color densities in correspondence with the density of said gray component color.

10. The method as set forth in claim 1, further including after step (f) the step of calculating an enhancement color density as a function of said final agent color densities.

11. The method as set forth in claim 1, said agent colors including cyan, magenta, and yellow and said color readings including red, green, and blue.

12. An apparatus for producing output signals representative of the agent color densities of coloring agents such as process inks or toners, to be used in producing a color-corrected image unit of an initial image unit using the coloring agents, said apparatus comprising:
   a processing unit, having memory means for storing selected data therein, for receiving input signals and for producing output signals in response thereto;
   means for entering input signals into the processing unit which are respectively representative of color readings of the image to be finally produced using the coloring agents;
   said processing unit including
   means for determining initial agent color densities that correspond relatively to said color readings entered into said processing unit,
   means for retrieving from said memory means previously stored data representative of respective contribution factors corresponding to the contribution to each of the agent colors from each of the other coloring agents,
   means for retrieving from the memory means previously stored data representative of certain predetermined nonlinearity correction factors which are representative of the particular coloring agents to be used in producing said image unit,
   means for calculating, for each agent color of a respective coloring agent, a contribution amount to each of the other coloring agents as a function of the effected thereon of the respective initial color density, contribution factor, and correction factor;
   means for calculating, for each agent color, a final agent color density as a function of its corresponding initial density and the contribution amounts from the other coloring agents, and
   means for producing output signals representative of each of said final agent color densities.

13. The apparatus as set forth in claim 12, said means for entering input signals including a scanner.

14. The apparatus as set forth in claim 12, said processing unit including a microcomputer.

15. The apparatus as set forth in claim 12, the reproduction unit including a film recorder.

16. The apparatus as set forth in claim 12, the reproduction unit including a laser printer.

17. The apparatus as set forth in claim 12, the reproduction unit including a xerographic color copier.

18. The apparatus as set forth in claim 12, the reproduction unit including a thermal transfer printer.

19. The apparatus as set forth in claim 12, the reproduction unit including an ink jet printer.

20. The apparatus as set forth in claim 12, said processing unit further including means for recalculating certain ones of said contribution amounts when the contributions to a given color from at least one of the other coloring agents exceeds a predetermined level.

21. The apparatus as set forth in claim 20, said recalculating means including means for calculating new correction factors for said given color.

* * * * *